United States Patent
Wong et al.

(10) Patent No.: US 10,197,588 B2
(45) Date of Patent: Feb. 5, 2019

(54) THIN FILM HEATING SYSTEMS FOR AIR DATA PROBES

(71) Applicant: Honeywell International Inc., Morris Plains, NJ (US)

(72) Inventors: Yates Wong, Humboldt, AZ (US); Grant A. Gordon, Peoria, AZ (US); Nicholas A Everson, Phoenix, AZ (US); Morris G. Anderson, Mesa, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 113 days.

(21) Appl. No.: 15/347,670

(22) Filed: Nov. 9, 2016

(65) Prior Publication Data
US 2018/0128849 A1 May 10, 2018

(51) Int. Cl.
| | |
|---|---|
| G01P 5/165 | (2006.01) |
| G01F 1/46 | (2006.01) |
| G01K 13/02 | (2006.01) |
| G01P 13/02 | (2006.01) |
| H05B 3/34 | (2006.01) |

(52) U.S. Cl.
CPC ............... G01P 5/165 (2013.01); G01F 1/46 (2013.01); G01K 13/028 (2013.01); G01P 13/025 (2013.01); H05B 3/34 (2013.01); H05B 2203/002 (2013.01); H05B 2203/013 (2013.01)

(58) Field of Classification Search
None
See application file for complete search history.

(56) References Cited

U.S. PATENT DOCUMENTS

| | | | |
|---|---|---|---|
| 2,370,102 A | 2/1945 | Woodman | |
| 2,428,542 A | 10/1947 | Bernhardt | |
| 2,984,107 A | 5/1961 | Strieby et al. | |
| 4,121,088 A * | 10/1978 | Doremus | B64D 15/16 219/201 |
| 4,377,343 A * | 3/1983 | Monson | G01B 9/02 73/147 |

(Continued)

FOREIGN PATENT DOCUMENTS

EP     2950106 A1    12/2015

OTHER PUBLICATIONS

European Patent Office, "Extended European Search Report for EP Application No. 17199289.4 dated Feb. 13, 2018", Foreign Counterpart to U.S. Appl. No. 15/347,670, dated Feb. 13, 2018, pp. 1-9, Published in: EP.

(Continued)

*Primary Examiner* — Harshad R Patel

(74) *Attorney, Agent, or Firm* — Fogg & Powers

(57) ABSTRACT

An air data probe is provided. The air data probe comprises an inner body having an outer surface, an outer body having an inner surface, a thin film heating system having a first surface and a second surface, a first thermally conductive adhesive disposed between the first surface and the outer surface, a second thermally conductive adhesive disposed between the second surface and the inner surface; and wherein the thin film heating system comprises one or more thin film heaters having one or more heating elements disposed in a thermally conductive, electrical insulator.

11 Claims, 8 Drawing Sheets

(56) References Cited

U.S. PATENT DOCUMENTS

| | | | |
|---|---|---|---|
| 4,836,019 A * | 6/1989 | Hagen | G01P 5/165 73/180 |
| 5,046,360 A * | 9/1991 | Hedberg | G01F 1/46 73/182 |
| 5,925,275 A | 7/1999 | Lawson et al. | |
| 5,925,815 A * | 7/1999 | Jones | G01N 25/18 374/164 |
| 6,070,475 A * | 6/2000 | Muehlhauser | G01F 1/46 73/861.68 |
| 6,370,450 B1 * | 4/2002 | Kromer | G01K 13/02 73/861.68 |
| 6,918,294 B1 | 7/2005 | Roberge | |
| 2003/0115948 A1 | 6/2003 | Rouse et al. | |
| 2005/0011285 A1 * | 1/2005 | Giterman | G01P 5/165 73/861.65 |
| 2010/0116806 A1 | 5/2010 | Hollingsworth et al. | |
| 2012/0006808 A1 | 1/2012 | Young | |
| 2016/0221680 A1 | 8/2016 | Burton et al. | |

OTHER PUBLICATIONS

American Semiconductor, "FleX-ICS: Silicon-on-Polymer Products", "Recieved by: http://www.americansemi.com/flex.html", Nov. 1, 2016, pp. 1-4.

American Semiconductor, "Flexible Hybrid Electronics—FleXform-ADC Flexible Hybrid Development Kit", "Recieved by: http://www.americansemi.com/fhe.html", Nov. 1, 2016, pp. 1-4.

www.atcsemitec.co.uk, "JT Thermistor Series (high accuracy, ultra-thin type)", "receieved from: http://www.atcsemitec.co.uk/pdfdocs/JT-flexible-thermistors.pdf dtd Apr. 29, 2015", Apr. 29, 2015.

www.calfinewire.com, "Ni 270 high purity nickel", "Retrieved from: http://www.calfinewire.com/index.php?id=292&datasheet=100139&keywords=ni%20120", Aug. 28, 2014, p. 1.

www.calfinewire.com, "Stablohm 710 30cr 70ni", "Retrieved from: http://www.calfinewire.com/datasheets/100224-stablohm710.html", Aug. 24, 2014, pp. 1-2.

www.calfinewire.com, "Stablohm 650 20cr 80ni", "retrieved from: http://www.calfinewire.com/datasheets/100187-stablohm650.html", Aug. 24, 2014, p. 1.

www.calfinewire.com, "Ni 120 Balco", "recieved from: http://www.calfinewire.com/datasheets/100135-nickelalloy120.html", Aug. 28, 2014, pp. 1-2.

Conflux, "Conflux A New World in Heating", "received by: http://www.conflux.se/", Nov. 1, 2016, pp. 1-2.

Flexenable, "Our Truly Flexible Transistor Technology Platform", "Received from: http://www.flexenable.com/technology/", Nov. 1, 2016, pp. 1-3.

Microconnex, "Thin Film & Plasma: Custom Sputtered Thin Films for Manufacturing and Advanced R&D Applications", "recieved by: https://www.microconnex.com/services/thin-film-and-plasma/", Nov. 1, 2016, pp. 1-5.

Murata Manufacturing Co., Ltd., "Murata Announces Mass Production of Low Profile Flexible Film Temperature Sensors Ideal for Wearable Products", "Received from: http://www.murata.com/en-us/about/newsroom/news/product/thermistor/2014/1022", Oct. 22, 2014, p. 1.

Omega, "Surface Thermocouples With Self-Adhesive Backing", "Recieved From: http://www.omega.com/pptst/SA1.html", Nov. 1, 2016, pp. 1-4.

Dupont, "Pyralux APR when reliable embedded resistor technology required", "recieved from: http://www.dupont.com/products-and-services/electronic-electrical-materials/flexible-rigidflex-circuit-materials/brands/pyralux-flexibl", Nov. 1, 2016, pp. 1-2.

European Patent Office, "Communication pursuant to Article 94(3) from EP Application No. 17199289.4 dated Sep. 5, 2018", from Foreign Counterpart to U.S. Appl. No. 15/347,670, filed Sep. 5, 2018, pp. 1-6, Published: EP.

\* cited by examiner

THIN FILM HEATING SYSTEMS FOR AIR DATA PROBES

BACKGROUND

External air data probes, such as pitot tubes, must endure extreme cold weather conditions, such as those experienced at high altitudes. In extreme cold weather conditions, the external air data probes are subject to icing which can cause malfunction. This results in faulty information being communicated to the pilots and flight computers, and in some cases aircraft crashes.

Extreme cold temperatures are mitigated by the addition of heaters to the air data probes. Conventionally this is accomplished by brazing metal heating elements to the air data probes. The brazing process is difficult, results in manufacturing yield loss, and is expensive. Furthermore, poorly brazed heater elements can lead to local cold spots on the surface of the air data probes that leave the air data probes susceptible to icing and possible malfunction. Therefore, there is a need for a more effective means of heating an air data probe.

SUMMARY

In one embodiment, an air data probe is provided. The air data probe comprises an inner body having an outer surface, an outer body having an inner surface, a thin film heating system having a first surface and a second surface, a first thermally conductive adhesive disposed between the first surface and the outer surface, a second thermally conductive adhesive disposed between the second surface and the inner surface; and wherein the thin film heating system comprises one or more thin film heaters having one or more heating elements disposed in a thermally conductive, electrical insulator.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
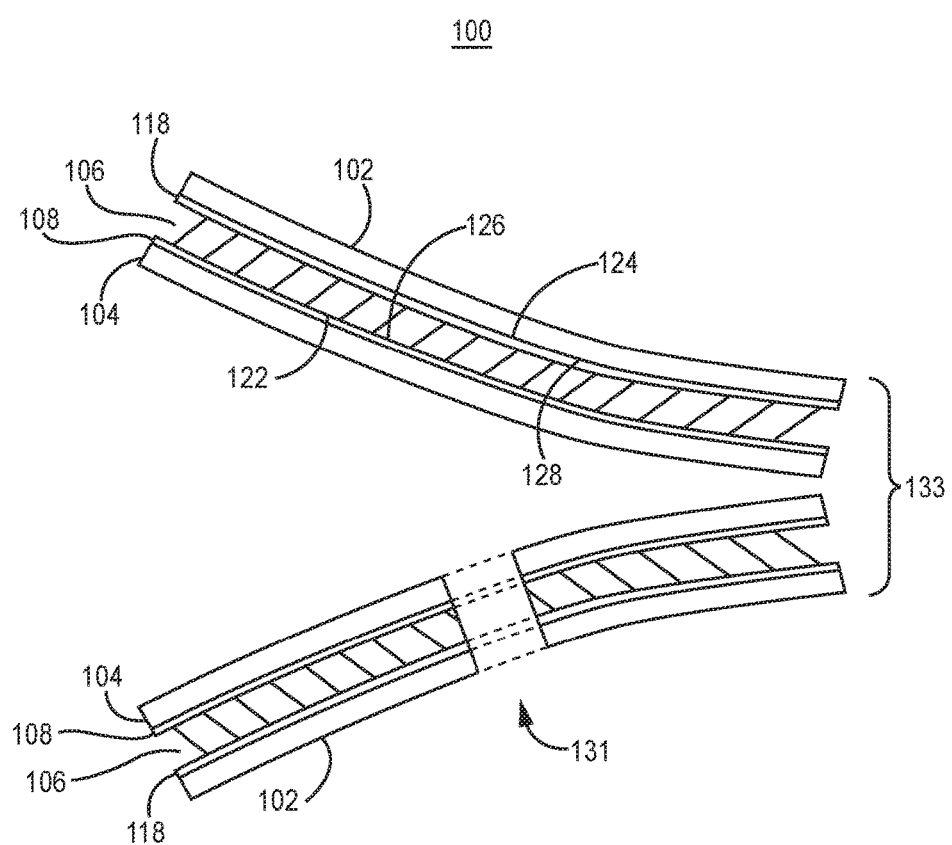
FIG. 1 illustrates a cross-section of a portion of an exemplary air data probe with a thin film heating system.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A thin film heating system attached by a thermally conductive adhesive to the inner and outer housings (or bodies) of an air data probe may be used to overcome the above referenced problems. The embodiments of an air data probe with a thin film heating system at least two advantages. Firstly, assembly of an air data probe with a thin film heating system is less expensive, and results in a higher production yield. Secondly, a thin film heating system provides more uniform heating of an air data probe than brazed metal heating elements. Further, although the present invention is exemplified as being used in a pitot tube, it is envisioned that it can be used in other air data probes including without limitation total air temperature and angle of attack probes. Additionally, although the present invention is exemplified as being used in an apparatus that is a vehicle, it is envisioned that it can be used apparatuses that are not vehicles.

FIG. 1 is a cross-section of a portion of an exemplary air data probe 100 with a thin film heating system 106. In one embodiment, the illustrated portion of the air data probe is a portion of a pitot tube. The exemplary air data probe 100 includes the thin film heating system 106 having a first side, or first surface, 122 attached to an outer surface 126 of an inner housing, or inner body, 104 by a first thermally conductive adhesive 108. The second side, or second surface, 124 of the thin film heating system 106 is attached to an inner surface 128 of an outer housing, or outer body, 102 by a second thermally conductive adhesive 118.

In one embodiment, the thin film heating system 106, the inner body 104, and the outer body 102 can have holes which align to form a drain hole 131 from which liquid, e.g. condensation, can escape. In another embodiment, the air data probe 100 can have multiple drain holes 131.

In one embodiment, the thin film heating system 106 conformally covers the outer surface 126 of the inner body 104, or a portion thereof. In another embodiment, the thin film heating system 106 only covers portions, e.g. one or more portions, of the air data probe 100 susceptible to colder temperatures, e.g. subject to more incident cold air, and/or cold weather particles such ice or freezing rain. In yet another embodiment, the thin film heating system 106 conformally covers the inner surface 128 of the outer body 102.

In one embodiment all or a portion of (a) the inner surface 128 of the outer body 102, and (b) the outer surface 126 of the inner body 104 are tapered at the same conical angle. This design facilitates trapping and compressing the thin film heating system 106, and the first thermally conductive adhesive 108 and the second thermally conductive adhesive 118 in a manner that reduces bubbles in the thermally conductive adhesives promoting enhanced thermal conductivity between the thin film heating system 106, and the inner body 104 and the outer body 102. In one embodiment, the conical design also forces the thin film heating system 106 towards the tip 133 of the air data probe 100 where heat is required the most.

In one embodiment, the outer body 102 is fit tightly, e.g. compression fit, over the inner body 104 to eliminate any air pockets between each of the outer body 102 and the inner body 104 leaving only thin layers of respectively the first thermally conductive adhesive 108 and the second thermally conductive adhesive 108. Thus, the thin film heating system 106 is compressed between the outer body 102 and the inner body 104.

In one embodiment, the inner body 104 and outer body 102 are made of lightweight materials including aluminum, titanium or carbon fiber. In another embodiment, the first thermally conductive adhesive 108 and the second thermally conductive adhesive 118 are the same material, or are different materials. In yet another embodiment, the first thermally conductive adhesive 108 and the second thermally conductive adhesive 118 are electrical insulators. In a further embodiment, the first thermally conductive adhesive 108 and the second thermally conductive adhesive 118 have the following characteristic: (a) a thermal conductivity between 1 to 2 W/mK; (b) a viscosity between 30,000 to 80,000 centipoise; (c) tolerate high temperatures, e.g. greater than 400 degrees Fahrenheit; and are otherwise environmentally robust. In yet a further embodiment the first thermally conductive adhesive 108 and the second thermally conductive adhesive 118 are thermally conductive adhesives such as thermally conductive silicones, thermally conductive epoxy, electrically conductive adhesives, silicate cements, and alumina adhesives. Examples of thermally conductive adhesives include Dow Corning® 1-4173 adhesive, Cotronics® Resbond® 920, Cotronics® Duralco® 125, Sauereisen Sealing Cement No. 33S, and Resinlab EP1200.

Figure 2:
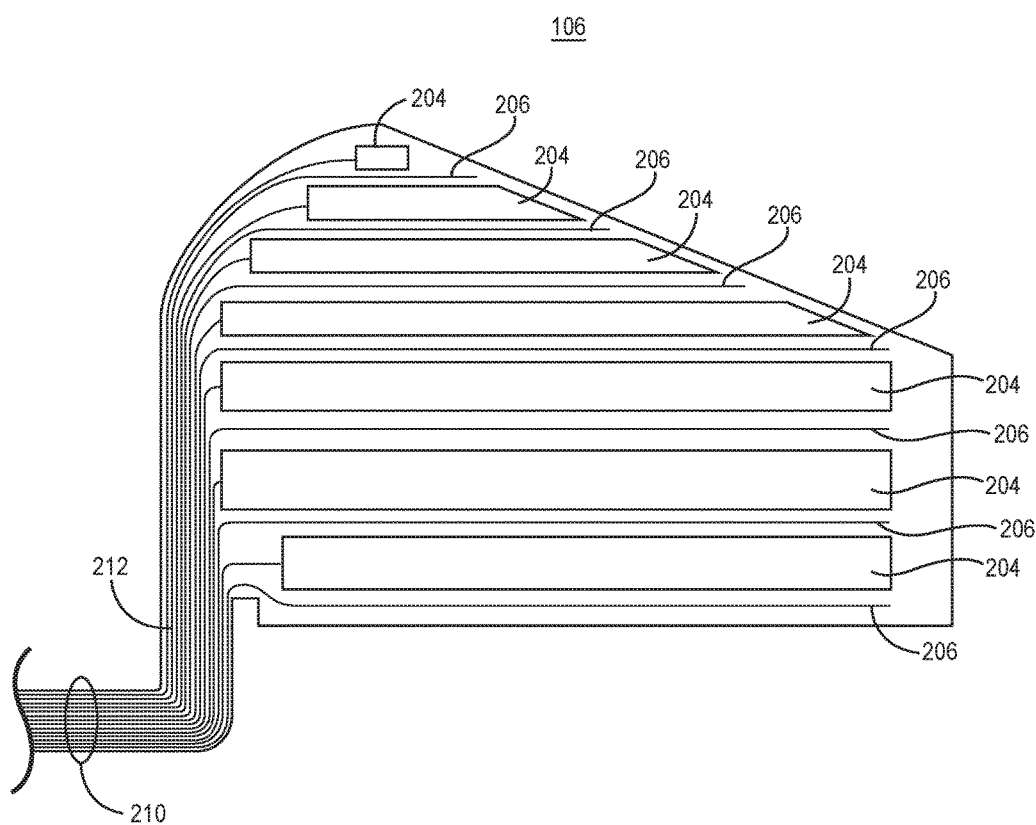
FIG. 2 illustrates a plan view of an exemplary thin film heating system.

FIG. 2 illustrates a plan view of an exemplary thin film heating system 106. In the illustrated embodiment, the thin film heating system 106 includes a plurality of thin film heaters 204. Other embodiments of a thin film heating system 106 can be implemented, e.g. with a varying number of thin film heaters 204 having varying shapes, dimensions, and spacing between other thin film heater(s) 204, etc.

FIG. 2 also illustrates the inclusion of temperature sensors 206 proximate to the thin film heaters 204. However, the inclusion of temperature sensor(s) 206 in a thin film heater 204 is optional. Other embodiments of a thin film heating system 106 can be implemented, e.g. with a varying number of temperature sensors 206 having varying shapes, dimensions, spacing between thin film heaters 204 and/or other temperature sensor(s) 206, etc. The temperature sensors 206 may be thermistors, thermocouples, and/or any other temperature measuring device which may be integrated into the thin film heating system 106.

In another embodiment, thin film heaters 204 may include low resistivity conductors 212, e.g. to supply power to heating element(s) and/or provide a signal path for voltage or current signals, for example, from temperature sensors 206. In a further embodiment, the thin film heating system 106 includes a connection interface 210, e.g. a ribbon cable formed contemporaneously with the rest of the thin film heating system 106, which includes low resistivity conductors 212 coupled to thin film heater(s) 204, and possibly temperature sensor(s) 206.

Figure 3:
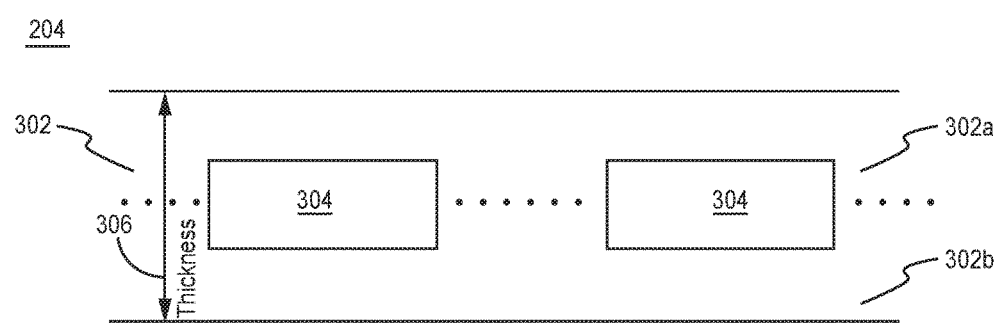
FIG. 3 illustrates a cross-section of an exemplary thin film heater.

FIG. 3 illustrates a cross-section of an exemplary thin film heater 204. The thin film heater 204 is formed by one or more heating elements 304 disposed in a thermally conductive, electrical insulator 302. The thermally conductive, electrical insulator 302, and thus the thin film heater 204, is flexible. In another embodiment, the electrical insulator is a polymer, such as polyimide, or ceramic material. In one embodiment, the thin film heater 204 is less than 2 millimeters in thickness 306. In another embodiment, the thin film heater 204 is between ½ and 2 millimeters in thickness 306.

In one embodiment, the thin film heater 204 has heating element(s) 304 formed on a first layer 302b of a thermally conductive, electrical insulator 302 that has high thermal conductivity. The heating element(s) 304 are covered by a second layer 302a of the thermally conductive, electrical insulator 302 that has a high thermal conductivity.

In one embodiment, after formation of the heating element(s) 304 (and possibly the low resistivity conductors 212 and/or temperature sensor(s) 206 if any), the heating element(s) 304 (and low resistivity conductors 212 and/or temperature sensor(s) 206 if any) are covered with a second layer 302a of the thermally conductive, electrical insulator 302. In another embodiment, the heating element(s) 304 are a resistive material, e.g. a metal or metal alloy (such as nickel, nichrome, or tungsten), a semiconductor, a polymer or a ceramic. In yet another embodiment, the heating element(s) 304 are made from a resistive material having a positive thermal coefficient so that the heating element(s) 304 generate more thermal power at lower temperatures then at higher temperatures; thus, such heating element(s) 304 self-limit the thermal power generated so as not to overheat. In a further embodiment, the thin film heaters 204 have a power density of between 50 to 150 Watts per square inch.

Figure 4:
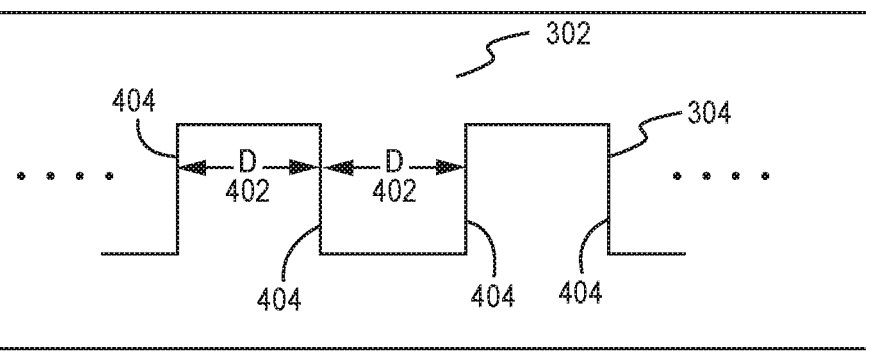
FIG. 4 illustrates a plan view of an exemplary thin film heater.

FIG. 4 illustrates a plan view of an exemplary thin film heater 204. In one embodiment, as illustrated in FIG. 4, the heating element(s) 304 is in a rectangular serpentine pattern with a distance D 402 between parallel individual heating element(s) 404; however, other patterns may be used. In the illustrated embodiment, the power density may be increased or decreased by respectively decreasing or increasing the distance D 402. In another embodiment, the heating element(s) 304 (and low resistivity conductors 212 and/or temperature sensors 206 if any) are formed (or patterned) on the thermally conductive, electrical insulator 302 by lithography and deposition, e.g. vapor deposition.

Figure 5:
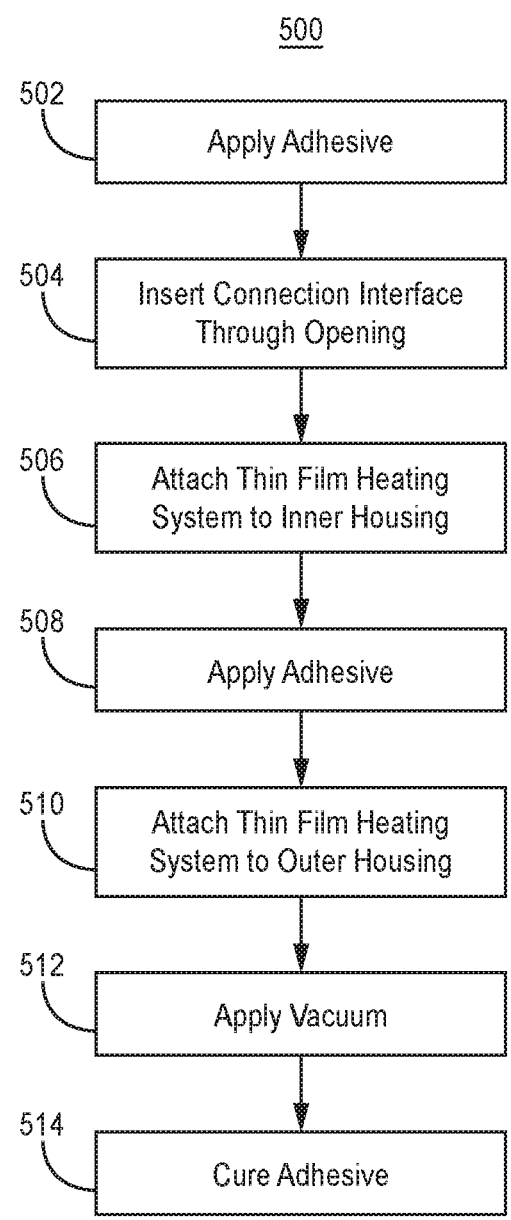
FIG. 5 illustrates an exemplary flow diagram of a method of manufacture of an air data probe with a thin film heating system.

Exemplary construction of an air data probe 100 will now be described. FIG. 5 illustrates an exemplary flow diagram of a method of manufacture 500 of an air data probe 100 with a thin film heating system 106. In block 502, in one embodiment, apply the first thermally conductive adhesive 108 to the first surface 122 of the thin film heating system 106. In another embodiment, the first thermally conductive adhesive 108 and the second thermally conductive adhesive 118 are applied simultaneously, or substantially simultaneously, respectively to the first surface 122 and the second surface 124 of the thin film heating system 106. Application of the second thermally conductive adhesive 118 will be described further subsequently.

Figure 6:
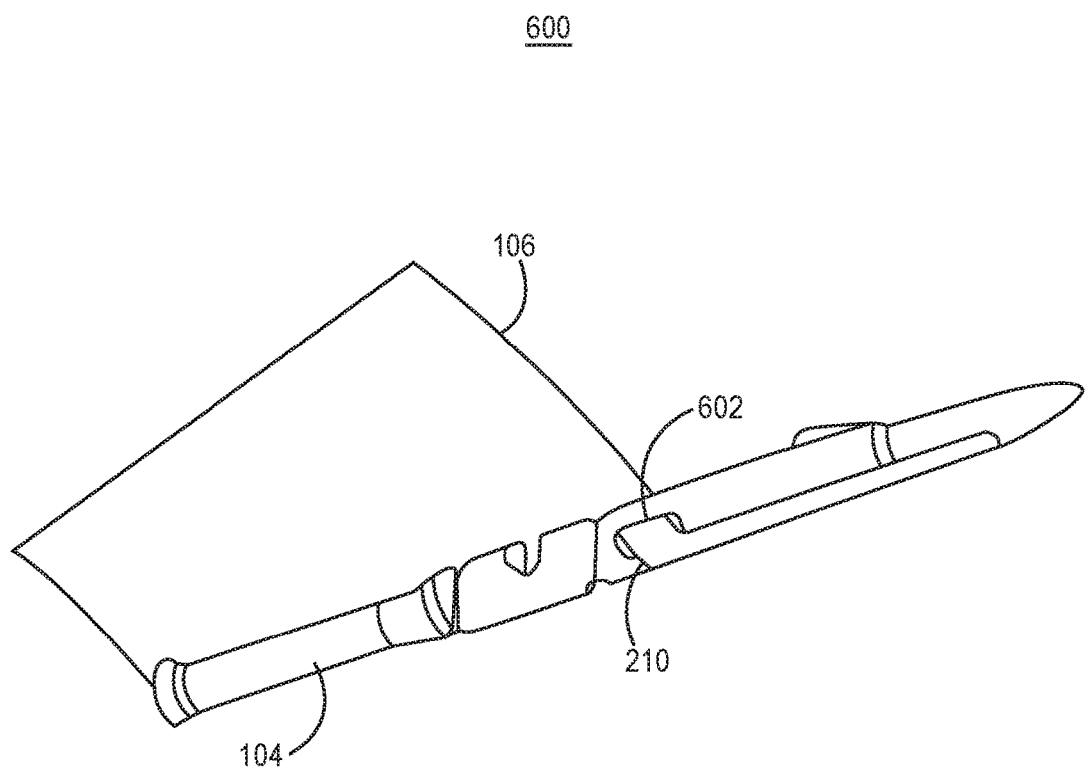
FIG. 6 illustrates an exemplary portion of an air data probe with a thin film heating system.

FIG. 6 illustrates an exemplary portion 600 of an air data probe with a thin film heating system during air probe construction. The exemplary portion 600 of the air data probe with the thin film heating system comprises an opening 602 in the inner body 104 also illustrated in FIG. 1. FIG. 6 illustrates the thin film heating system 106 including its connecting interface 210 which are also illustrated in FIGS. 1 and 2.

Returning to FIG. 5, in one embodiment, in block 504 and as illustrated in FIG. 6, insert the connection interface 210 through the opening 602 in the inner body 104. Thus, in such an embodiment, a portion of the connection interface 210 is in the opening 602 in the inner body 104.

Then, in block 506, in one embodiment, attach (using the first thermally conductive adhesive 108) the first surface 122 of the thin film heating system 106 to the outer surface 126 of the inner body. In another embodiment, if the first thermally conductive adhesive 108 and the second thermally conductive adhesive 118 are applied, then the first surface 122 and the second surface 124 of the thin film heating system 106 are attached at the same time, or substantially the same time, respectively to the outer surface 126 of the inner body using the first thermally conductive adhesive 108 and the inner surface 128 of an outer body 102 using the second thermally conductive adhesive 118.

In one embodiment, pressure is placed over the thin film heating system 106 to eliminate any air pockets in the first thermally conductive adhesive 108 to improve the thermal conductivity between the thin film heating system 106 and the inner body 104, e.g. the uniformity of the high thermal conductivity between the thin film heating system 106 and the inner body 104. In other words, to make the thermal conductivity between the thin film heating system 106 and the inner body 104 close to or substantially equal to the thermal conductivity of the first thermally conductive adhesive 108. Air bubbles in the thermally conductive adhesives can result in hot spots in the thin film heating system 106, and corresponding cold spots on the air data probe 100.

In another embodiment, if the thin film heating system 106 has been attached to both the outer surface 126 of the inner body and the inner surface 128 of an outer body 102, then place substantially uniform pressure over the first surface 122 and second surface 124 of the thin film heating system 106 to eliminate any air pockets in the first thermally conductive adhesive 108 and the second thermally conductive adhesive 118; this improves the thermal conductivity between the thin film heating system 106 and the inner body 104 and the outer body 102, e.g. the uniformity of the high thermal conductivity between the thin film heating system 106, and the inner body 104 and the outer body 102. In other words, to make the thermal conductivity between the thin film heating system 106 and the outer body 102 close to or substantially equal to the thermal conductivity of the second thermally conductive adhesive 118. Also, make the thermal conductivity between the thin film heating system 106 and the inner body 104 close to or substantially equal to the thermal conductivity of the first thermally conductive adhesive 108.

Then, in one embodiment, if not already applied, in block 508, apply the second thermally conductive adhesive 118 to the second surface 124 of the thin film heating system 106. Then, in one embodiment, in block 510, if not already attached, attach (using the second thermally conductive adhesive 118) the second surface 124 of the thin film heating system 106 to the inner surface 128 of an outer body 102. In another embodiment, the gap between the inner body 104 and the outer body 102 is such that substantially uniform pressure is placed over the first surface 122 and second surface 124 of the thin film heating system 106 to eliminate any air pockets in the first thermally conductive adhesive 108 and the second thermally conductive adhesive 118; this improves the thermal conductivity between the thin film heating system 106 and the inner body 104 and the outer body 102, e.g. the uniformity of the high thermal conductivity between the thin film heating system 106, and the inner body 104 and the outer body 102. In other words, to make the thermal conductivity between the thin film heating system 106 and the outer body 102 close to or substantially equal to the thermal conductivity of the second thermally conductive adhesive 118.

Then, in one embodiment, in block 512, apply a vacuum, e.g. using a vacuum chamber, to the air data probe 100 to remove air pockets from the first thermally conductive adhesive 108 and the second thermally conductive adhesive 118 to improve the thermal conductivity between the thin film heating system 106 and each of the inner body 104 and the outer body 102. For example, this further improves the uniformity of the high thermal conductivity between the thin film heating system, and the inner body 104 and the outer body 102.

Improving the uniformity of the high thermal conductivity between the thin film heating system 106, and the inner body 104 and the outer body 102, results in uniform and effective heating of the air data probe 100. In one embodiment, thermally conductive adhesive 108 and the second thermally conductive adhesive 118 may be cured during this block if a vacuum oven is used.

Then, in one embodiment, in block 514, if not already cured, cure the first thermally conductive adhesive 108 and the second thermally conductive adhesive 108. Such curing can be performed in an oven.

Figure 7:
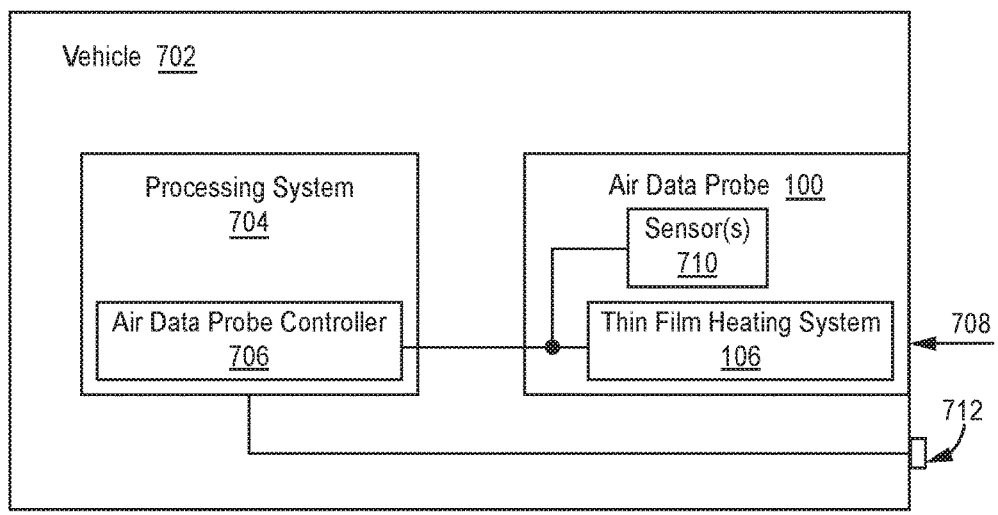
FIG. 7 illustrates an exemplary block diagram of a vehicle.

The exemplary use of an air data probe 100 with a thin film heating system 106 will now be described. FIG. 7 illustrates an exemplary block diagram of a vehicle 702, e.g. an aircraft, including a processing system 704 coupled to at least one air data probe 100. In one embodiment, the air data probe 100 is configured to be mounted on an exterior surface 708 of an apparatus such as a vehicle 702; thus the air data probe 100 can be mounted on the exterior surface 708 of the vehicle 702. In one embodiment, the processing system 704 may be a central air data computer (CADC). In another embodiment, the processing system 704 includes an air data probe controller 706 which receives data from the air data probe 100 and also provides power to the thin film heating system. In yet a further embodiment, all or a portion of the air data probe controller 706 can be located elsewhere including within the air data probe 100.

In one embodiment, the air data probe 100 includes sensor(s) 710 and the thin film heating system 106. In another embodiment, the sensor(s) 710 and the thin film heating system 106 are coupled to the processing system 704, e.g. the air data probe controller 706. For example, for an air data probe 100 that is a pitot tube, the sensor(s) 710 may be piezoelectric pressure sensors.

In one embodiment, the processing system 704, e.g. the air data probe controller 706 supplies electric power to the thin film heating system 106 so that the thin film heating system 106 generates thermal power to heat the air data probe 100. In another embodiment, such electric power, and thus the thermal power, is supplied only when a temperature sensor (e.g. a temperature sensor 712 on the exterior surface 708 of the vehicle 702, or temperature sensor(s) 206, if any, in the thin film heating system 106) provides information to the processing system 702 that the temperature outside of the vehicle 702 is sufficiently cold, e.g. below a threshold temperature, so that the air data probe 100 should be heated by the thin film heating system 106. In a further embodiment, the temperature sensor 712 is a thermistor, a thermocouple, or other type of temperature sensor.

In one embodiment, in the event that two or more temperature sensors 206 are placed in different locations on the thin film heating system 106, the processing system 704, e.g. the air data probe controller 706, can sense the temperature at different regions of the thin film heating system 106, and thus different regions of the air data probe 100. Based upon such information, the processing system 704, e.g. the air data probe controller 706, can independently regulate electric power provided to, and thus the temperature of, such different regions. This technique can be used to reduce or eliminate cold or hot spots on the air data probe 100.

Figure 8:
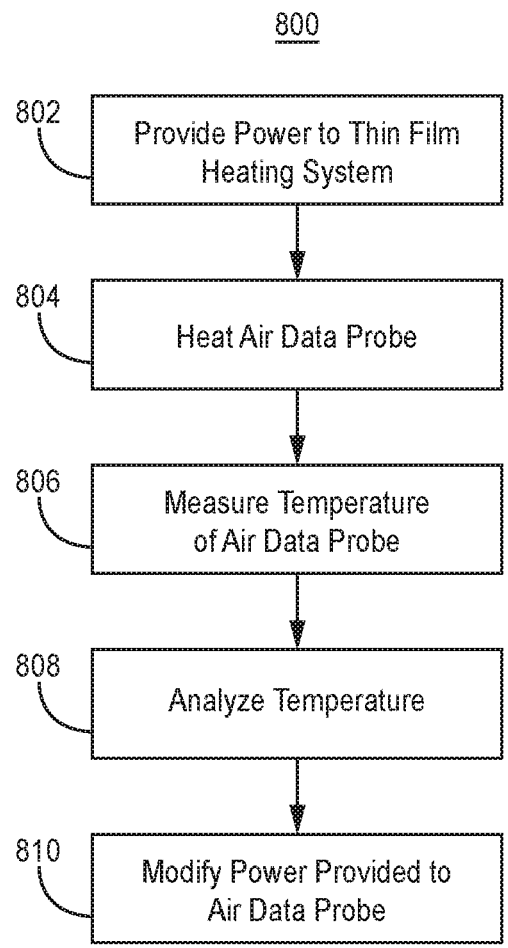
FIG. 8 illustrates an exemplary flow diagram of a method of operation of an air data probe with a thin film heating system.

FIG. 8 illustrates an exemplary flow diagram of a method of operation 800 of an air data probe 100 with a thin film heating system 106.

In one embodiment, in block 802, provide electric power to the thin film heating system 106. In another embodiment, electric power is selectively provided to one or more thin film heaters 204 in the thin film heating system 106.

In one embodiment, in block 804, heat the air data probe 100 as a result of the electric power being converted to thermal power by one or more heating elements 304. In another embodiment, the thermal power spreads (or conducts), through the first thermally conductive adhesive 108 and the second thermally conductive adhesive 118, respectively to the inner body 104 and the outer body 102 of the air data probe 100.

In one embodiment, in block 806, measure the temperature of the air data probe 100. In one embodiment, the temperature is measured by a temperature sensor 712 on the exterior surface of the vehicle 702 or temperature sensor(s) 206, if any, in the thin film heating system 106. In another embodiment, temperatures are measured by more than one temperature sensor 206, or more than one set of temperature sensors 206, in the thin film heating system 106. Different temperatures may be measured for two or more sets of temperature sensors 206, e.g. based upon location, providing a temperature profile (by location) of the air data probe 100. As will be further illustrated, this facilitates locating, and then compensating for, temperature variations, such as hot and/or cold spots, on the air data probe 100.

In one embodiment, in block 808, analyze the measured temperature(s), e.g. in the processing system or, for example, more particularly in the air data probe controller 706. In another embodiment, ascertain whether the temperature(s) measured at the air data probe 100 are too high and/or low; that is determine the presence of hot and/or cold spots. In one embodiment, such analysis is undertaken by comparing the measured temperature(s) with threshold temperature(s) below which the air data probe 100 must be heated or further heated.

In one embodiment, in block 810, modify the electric power provided to the thin film heating system 106 if measured temperature(s) are too high and/or too low. In another embodiment, selectively modify the electric power provided to two or more groups of thin film heaters 204 in the thin film heating system 106; the modification of electric power provided to the two or more groups may differ by group depending upon the corresponding temperature measured proximate to each group. In another embodiment, each group of thin film heater 204 can be one or more thin film heater(s) 204.

Exemplary Embodiments

Example 1 includes an air data probe, comprising: an inner body having an outer surface; an outer body having an inner surface; a thin film heating system having a first surface and a second surface; a first thermally conductive adhesive disposed between the first surface and the outer surface; a second thermally conductive adhesive disposed between the second surface and the inner surface; and wherein the thin film heating system comprises one or more thin film heaters having one or more heating elements disposed in a thermally conductive, electrical insulator.

Example 2 includes the air data probe of Example 1, wherein the air data probe is a pitot tube.

Example 3 includes the air data probe of Examples 1-2, wherein the thin film heating system has a thickness less than 2 millimeters.

Example 4 includes the air data probe of Examples 1-3, wherein the thin film heating system further comprises a connection interface, coupled to the one or more thin film heaters, configured to be coupled to a processing system; and wherein the air data probe is configured to be mounted on an exterior surface of an apparatus.

Example 5 includes the air data probe of Example 4, wherein a portion of the connection interface is in an opening in the inner body.

Example 6 includes the air data probe of Example 1, wherein the thin film heating system further comprises one or more temperature sensors coupled to a connection interface.

Example 7 includes the air data probe of Examples 1-6, wherein the one or more thin film heaters having one or more heating elements disposed in a thermally conductive, electrical insulator further comprises one or more thin film heaters comprising the one or more heating elements on a first layer of the thermally conductive, electrical insulator, and a second layer of the thermally conductive, electrical insulator covering the heating elements.

Example 8 includes the air data probe of Example 7, wherein the thermally conductive, electrical insulator consists of one of a polymer or a ceramic.

Example 9 includes the air data probe of Examples 1-8, wherein at least a portion of the inner surface and a portion of the outer surface are tapered at the same conical angle.

Example 10 includes the air data probe of Examples 7-9, wherein each heating element is made from a resistive material consisting of a metal, a metal alloy, a polymer, or a ceramic.

Example 11 includes the air data probe of Examples 7-10 wherein each heating element has a positive temperature coefficient.

Example 12 includes a method of manufacturing an air data probe, comprising:

applying a first thermally conductive adhesive to a first surface of a thin film heating system comprising one or more thin film heaters having one or more heating elements disposed in a thermally conductive, electrical insulator;

attaching, with the first thermally conductive adhesive, the first surface of the thin film heating system to a surface of a inner body of the air data probe; applying a second thermally conductive adhesive to a second surface of the thin film heating system; and attaching, with the second thermally conductive adhesive, the second surface of the thin film heating system to a surface of an outer body of the air data probe.

Example 13 includes the method of Example 12, further comprising inserting a connection interface through an opening in the inner body.

Example 14 includes the method of Examples 12-13, wherein attaching, with the first thermally conductive adhesive, the first surface of the thin film heating system to the surface of the inner body of the air data probe further comprises placing pressure over the thin film heating system to improve thermal conductivity between the thin film heating system and the inner body.

Example 15 includes the method of Examples 12-14, wherein attaching, with the second thermally conductive adhesive, the second surface of the thin film heating system to the surface of a outer body of the air data probe comprises placing pressure over the thin film heating system to improve thermal conductivity between the thin film heating system and the inner body, and between the thin film heating system and the outer body.

Example 16 includes the method of Examples 12-15, further comprising applying a vacuum to the air data probe to improve thermal conductivity between the thin film heating system and the inner body, and between the thin film heating system and the outer body.

Example 17 includes a method of operating an air data probe, comprising:
providing electric power to a thin film heating system, attached by thermally conducting adhesives to inner and outer bodies of the air data probe; and heating the air data probe by converting the electric power to thermal power in a one or more heaters and conducting the thermal power through the thermally conducting adhesives to the inner and outer bodies.

Example 18 includes the method of Example 17, further comprising: measuring the temperature of the air data probe; analyzing the temperature; and modifying the electrical power provided to thin film heating system.

Example 19 includes the method of Example 18, wherein measuring the temperature of the air data probe further comprises measuring the temperature of the air data probe with a temperature sensor in the thin film heating system.

Example 20 includes the method of Examples 18-19, wherein measuring the temperature of the air data probe further comprises measuring temperatures with two or more temperature sensors in the thin film heating system; wherein analyzing the temperature further comprises analyzing the measured temperatures; and modifying the electrical power provided to the thin film heating system further comprises selectively modifying the electric power provided to two or more groups of thin film heaters in the thin film heating system.

It will be evident to one of ordinary skill in the art that the processes and resulting apparatus previously described can be modified to form various apparatuses having different circuit implementations and methods of operation. Notwithstanding that the numerical ranges and parameters setting forth the broad scope of the present teachings are approximations, the numerical values set forth in the specific examples are reported as precisely as possible.

Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An air data probe, comprising:
an inner housing having an outer surface;
an outer housing having an inner surface;
wherein at least a portion of the inner housing and a portion of the outer housing are tapered at a same conical angle;
a thin film heating system having a first surface and a second surface;
a first thermally conductive adhesive disposed between the first surface and a portion of the outer surface corresponding to the tapered portion of the inner housing;
a second thermally conductive adhesive disposed between the second surface and the inner surface corresponding to the tapered portion of the outer housing; and
wherein the thin film heating system comprises one or more thin film heaters having one or more heating elements disposed in a thermally conductive, electrical insulator.

2. The air data probe of claim 1, wherein the air data probe is a pitot tube.

3. The air data probe of claim 1, wherein the thin film heating system has a thickness less than 2 millimeters.

4. The air data probe of claim 1, wherein the thin film heating system further comprises a connection interface, coupled to the one or more thin film heaters, configured to be coupled to a processing system and to supply power to the one or more thin film heaters; and
wherein the air data probe is configured to be mounted on an exterior surface of an apparatus.

5. The air data probe of claim 4, wherein a portion of the connection interface is in an opening in the inner housing.

6. The air data probe of claim 1, wherein the thin film heating system further comprises one or more temperature sensors coupled to a connection interface.

7. The air data probe of claim 1, wherein the one or more thin film heaters having one or more heating elements disposed in a thermally conductive, electrical insulator further comprises one or more thin film heaters comprising the one or more heating elements on a first layer of the thermally conductive, electrical insulator, and a second layer of the thermally conductive, electrical insulator covering the heating elements.

8. The air data probe of claim 7, wherein the thermally conductive, electrical insulator consists of one of a polymer or a ceramic.

9. The air data probe of claim 7, wherein each heating element is made from a resistive material consisting of a metal, a metal alloy, a polymer, or a ceramic.

10. The air data probe of claim 7 wherein each heating element has a positive temperature coefficient.

11. The air data probe of claim 1, wherein the thin film heating system conformally covers the outer surface of the inner body.

\* \* \* \* \*